(12) United States Patent
Yu et al.

(10) Patent No.: US 10,768,075 B2
(45) Date of Patent: Sep. 8, 2020

(54) RACK DISTURBANCE TEST FOR DETERMINING THE FREQUENCY RESPONSE OF AN ELECTRIC POWER STEERING SYSTEM

(71) Applicant: GM Global Technology Operations LLC, Detroit, MI (US)

(72) Inventors: Bo Yu, Novi, MI (US); Ian Y. Hwa, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 16/008,677

(22) Filed: Jun. 14, 2018

(65) Prior Publication Data

US 2019/0383707 A1 Dec. 19, 2019

(51) Int. Cl.
*G01M 17/06* (2006.01)
*B62D 15/02* (2006.01)
*B62D 5/04* (2006.01)
*G01L 5/22* (2006.01)

(52) U.S. Cl.
CPC ............ *G01M 17/06* (2013.01); *B62D 5/0481* (2013.01); *B62D 15/021* (2013.01); *G01L 5/221* (2013.01)

(58) Field of Classification Search
USPC .......................................................... 701/41
See application file for complete search history.

(56) References Cited

U.S. PATENT DOCUMENTS

| | | | |
|---|---|---|---|
| 2013/0311072 A1* | 11/2013 | Tochihara | B62D 5/0481 701/112 |
| 2014/0058630 A1* | 2/2014 | Kezobo | B62D 5/0472 701/42 |
| 2016/0325776 A1* | 11/2016 | Yamamoto | B62D 6/10 |
| 2017/0282972 A1* | 10/2017 | Moretti | B60W 50/04 |
| 2017/0331403 A1* | 11/2017 | Irie | H02P 6/15 |
| 2018/0339727 A1* | 11/2018 | Ueyama | B62D 5/0409 |
| 2019/0383707 A1* | 12/2019 | Yu | B62D 5/0481 |

OTHER PUBLICATIONS

U.S. Appl. No. 15/840,974, First Named Inventor: Ian Y. Hwa, "Systems and Methods for Determining Steering Performance," filed Dec. 13, 2017.
U.S. Appl. No. 15/787,883, First Named Inventor: Bo Yu, "Estimating Stability Margins in a Steer-by-Wire System," filed Oct. 19, 2017.

* cited by examiner

*Primary Examiner* — Tyler D Paige

(57) ABSTRACT

A system and method for determining a frequency response of a power steering system is disclosed including a steering assist motor configured to generate an assist torque about an axis of a steering shaft when activated. The method includes monitoring, by a controller, a torque transducer that measures a steering output torque of the steering shaft experienced during a first frequency sweep and a second frequency sweep. The method also includes determining, by the controller, a transfer function based on the steering output torque monitored during the first frequency sweep and the second frequency sweep, where the transfer function indicates the response by the power steering system.

20 Claims, 7 Drawing Sheets

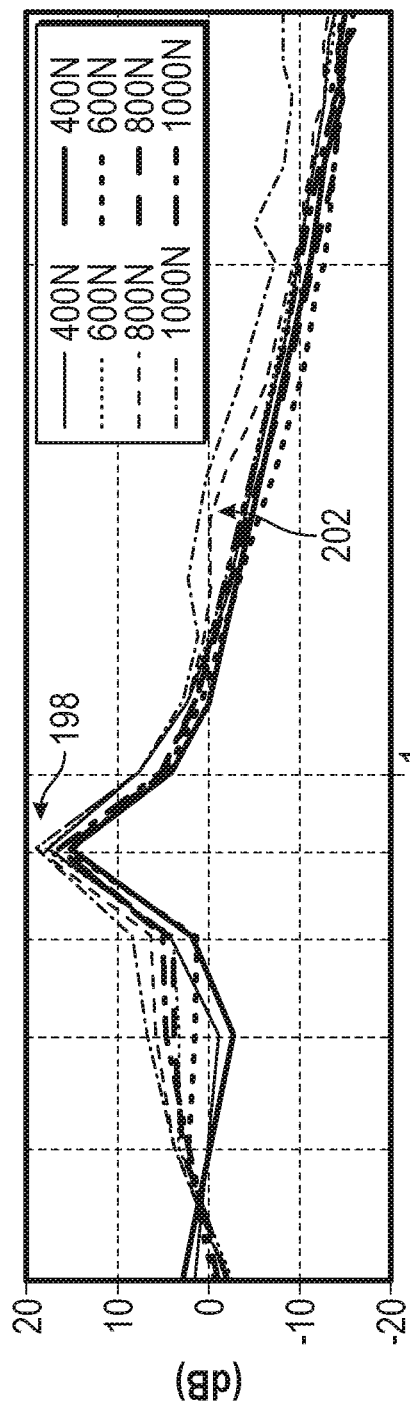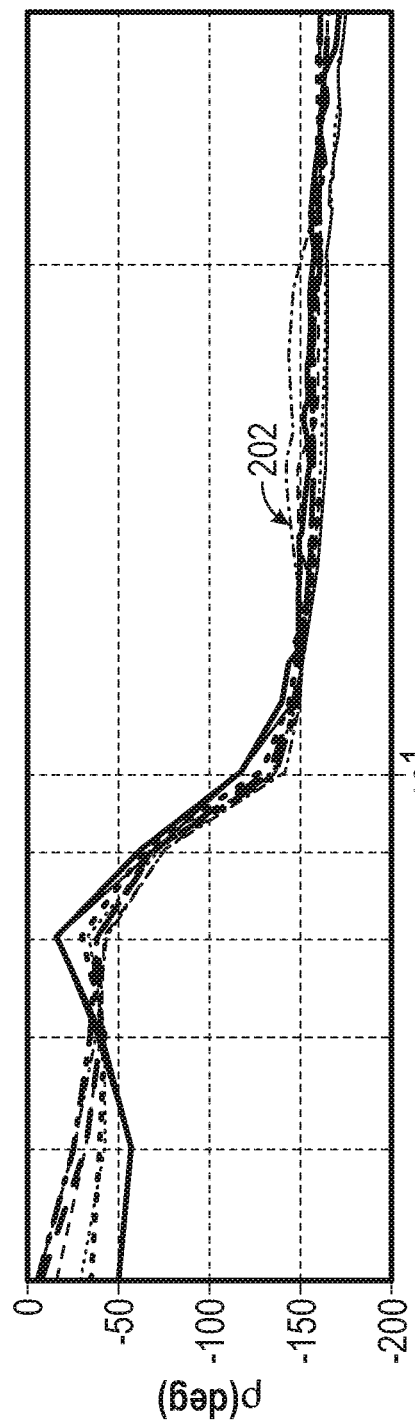
FIG. 3A
FIG. 3B

RACK DISTURBANCE TEST FOR DETERMINING THE FREQUENCY RESPONSE OF AN ELECTRIC POWER STEERING SYSTEM

INTRODUCTION

The present disclosure relates to a system and method for testing a power steering system. In particular, the disclosure is directed towards a system and method for executing a rack disturbance test to determine the frequency response of a power steering system.

Steering systems usually include a steering wheel connected to the front wheels of a vehicle, where a driver manipulates the steering wheel to control the direction of the vehicle's motion. Many vehicles are equipped with a power steering system to reduce the overall effort required to turn the steering wheel. If a vehicle does not include a power steering system, then the driver may need to exert a great amount of force to turn the steering wheel. The effort required to turn the steering wheel may be especially pronounced at lower speeds and while parking the vehicle. Some vehicles may also have a rear steering system that steers the rear wheels, where the front and rear steering systems work in concert to create a four-wheel steering system.

A power steering system includes electric or hydraulic actuators for augmenting the mechanical force exerted by the driver upon the steering wheel. For example, an electric power steering (EPS) system includes an electric motor coupled to a shaft along a steering axis or rack by a drive mechanism. The electric motor generates an assist torque and is in communication with a steering assist controller that stores algorithms for calculating the assist torque generated by the electric motor.

The frequency response of a system represents the relationship between the input and the output of a system at various frequencies. The frequency response of a power steering system is based on the algorithms stored in the steering assist controller that are used to calculate the assist torque. However, in at least some instances, it may not be possible to access the algorithms stored in the steering assist controller. This may become problematic since existing test procedures for estimating the frequency response may require access to the algorithms stored in the steering controller.

Thus, while existing test procedures achieve their intended purpose, there is a need for a new and improved system and method for determining the frequency response of a power steering system.

SUMMARY

According to several aspects, a method for determining a frequency response of a power steering system is disclosed. A steering assist motor is configured to generate an assist torque about an axis of a steering shaft when activated. The method includes transmitting, by a controller, a commanded steering angle to a rotary actuator connected to the steering shaft. In response to receiving the commanded steering angle, the method includes actuating the rotary actuator into the commanded steering angle. The rotary actuator maintains position by exerting a steering wheel torque. The steering shaft is connected to the rotary actuator by a compliant torsion bar and an inertial wheel. The method includes transmitting, by the controller, a rack disturbance force control signal to at least one actuator, where the at least one actuator is coupled to a rack and configured to actuate the rack in a substantially linear direction. In response to receiving the rack disturbance force control signal, the method includes generating a first frequency sweep and a second frequency sweep by the at least one actuator, where the steering assist motor is deactivated during the first frequency sweep and activated during the second frequency sweep. The method further includes monitoring, by the controller, a torque transducer that measures a steering output torque of the steering shaft experienced during the first frequency sweep and the second frequency sweep. Finally, the method includes determining, by the controller, a transfer function based on the steering output torque monitored during the first frequency sweep and the second frequency sweep. The transfer function indicates the frequency response by the power steering system.

In an additional aspect of the present disclosure, the method includes determining the transfer function by calculating a mechanical transfer function based on the steering output torque measured during the first frequency sweep.

In another aspect of the disclosure, the method further includes determining the mechanical transfer function based on:

$$RDF2SWT_{na}(s) = MTF_1(s) = \frac{SWT_{na}(s)}{RDF_{na}(s)}$$

where $RDF2SWT_{na}(s)$ is an estimated transfer function from the rack disturbance force to the steering wheel torque without assistance from the steering assist motor, $SWT_{na}$ is the steering wheel torque without assistance from the steering assist motor, and $RDF_{na}$ is the rack disturbance force without assistance from the steering assist motor.

In still another aspect of the disclosure, the method further includes determining an estimated transfer function from the rack disturbance force to the steering wheel torque with assistance from the steering assist motor by:

$$RDF2SWT_{wa}(s) = \frac{SWT_{wa}(s)}{RDF_{wa}(s)}$$

where $RDF2SWT_{wa}(s)$ is an estimated transfer function from the rack disturbance force to the steering wheel torque with assistance from the assist motor, $SWT_{wa}$ is the steering wheel torque with the steering assist motor activated, and $RDF_{wa}$ is a rack disturbance force with the steering assist motor activated.

In yet another aspect of the disclosure, the transfer function is further calculated by:

$$L_1(s) = \frac{RDF2SWT_{na}(s)}{RDF2SWT_{wa}(s)} - 1$$

In an aspect of the disclosure, algorithms for determining the steering torque assist control signal are stored in a memory of a steering controller. The controller is unable to access the algorithms stored in the memory of the steering controller.

In another aspect of the disclosure, the method includes determining, by the controller, a gain margin of the power steering system. The gain margin is an additional amount of gain required for a magnitude of the power steering system to be 0 decibels when a phase of the power steering system is −180 degrees.

In yet another aspect of the disclosure, the method includes determining, by the controller, a phase margin of the power steering system by calculating an amount of phase lag required for the power steering system to be −180 degrees when the magnitude of the power steering system is zero.

In still another aspect of the disclosure, the method includes determining, by the controller, a Nyquist plot including the gain margin and phase margin, and then calculating a stability margin based on the Nyquist plot of the gain margin and the phase margin.

In yet another aspect of the disclosure, the rack disturbance force is a variable waveform that is either a sinusoidal wave, a white noise signal, or a multi-sine signal.

In an additional aspect of the present disclosure, a method of determining a frequency response for a power steering system for either a steer-by wire or an autonomous vehicle is disclosed. A steering assist motor is configured to generate an assist torque about an axis of a steering shaft when activated. The method includes transmitting, by a controller, a commanded steering angle to a rotary actuator connected to the steering shaft. The steering shaft is connected to the rotary actuator by a compliant torsion bar and inertial wheel. In response to receiving the commanded steering angle, the rotary actuator is actuated to the commanded steering angle and maintains position by exerting a steering wheel torque. The method further includes transmitting, by the controller, a rack disturbance force control signal to at least one actuator. The at least one actuator is coupled to a rack and is configured to actuate the rack in a substantially linear direction. In response to receiving the rack disturbance force control signal, the method includes generating a first frequency sweep by the at least one actuator, where the steering assist motor is deactivated during the first frequency sweep. The method also includes generating a second frequency sweep by the actuator. The steering assist motor is activated and the commanded steering angle is set to zero during the second frequency sweep. The method also includes generating a steering angle frequency sweep based on the commanded steering angle. The steering assist motor is activated and the actuator is disconnected during the steering angle frequency sweep. The method includes monitoring, by the controller, a rotary encoder coupled to the steering shaft. The rotary encoder measures a steering angle experienced during the first frequency sweep, the second frequency sweep, and the steering angle frequency sweep. The method includes determining, by the controller, a transfer function based on the steering angle monitored during the first frequency sweep and the second frequency sweep. The transfer function indicates the frequency response of the power steering system. The method also includes determining, by the controller, effects of a feedforward algorithm upon the power steering system based on the steering angle monitored during the steering angle frequency sweep.

In another aspect of the present disclosure, a power steering system is disclosed. The system includes a compliant torsion bar, an inertial wheel, a rack defining a first end portion and a second end portion, a first actuator disposed on the first end portion of the rack and a second actuator disposed on the second end portion of the rack, a steering shaft rotatable about a steering axis, a pinion gear connecting the rack to the steering shaft, a steering assist motor configured to generate an assist torque about the steering axis of the steering shaft, a torque transducer configured to measure a steering output torque of the steering shaft, a rotary actuator connected to the steering shaft, and a controller. The steering shaft is connected to the rotary actuator by the compliant torsion bar and the inertial wheel. The controller is in communication with the first actuator, the second actuator, and the rotary actuator. The controller is configured to transmit a commanded steering angle to the rotary actuator. The rotary actuator is actuated to the commanded steering angle and maintains position by exerting a steering wheel torque. The controller is also configured to transmit a rack disturbance force control signal to the first actuator and the second actuator. The controller is further configured to instruct the first actuator and the second actuator to generate a first frequency sweep and a second frequency sweep. The steering assist motor is deactivated during the first frequency sweep and activated during the second frequency sweep. The controller is also configured to monitor the torque transducer for the steering output torque of the steering shaft experienced during the first frequency sweep and the second frequency sweep. Finally, the controller is configured to determine a transfer function based on the steering output torque monitored during the first frequency sweep and the second frequency sweep. The transfer function indicates the frequency response of the power steering system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is a graph of a Bode plot illustrating an exemplary magnitude response for the test system in FIG. 1 according to an exemplary embodiment;

FIG. 3B is a graph of a Bode plot illustrating an exemplary phase response for the test system in FIG. 1 according to an exemplary embodiment;

DETAILED DESCRIPTION

The following description is merely exemplary in nature and is not intended to limit the present disclosure, application, or uses.

Figure 1:
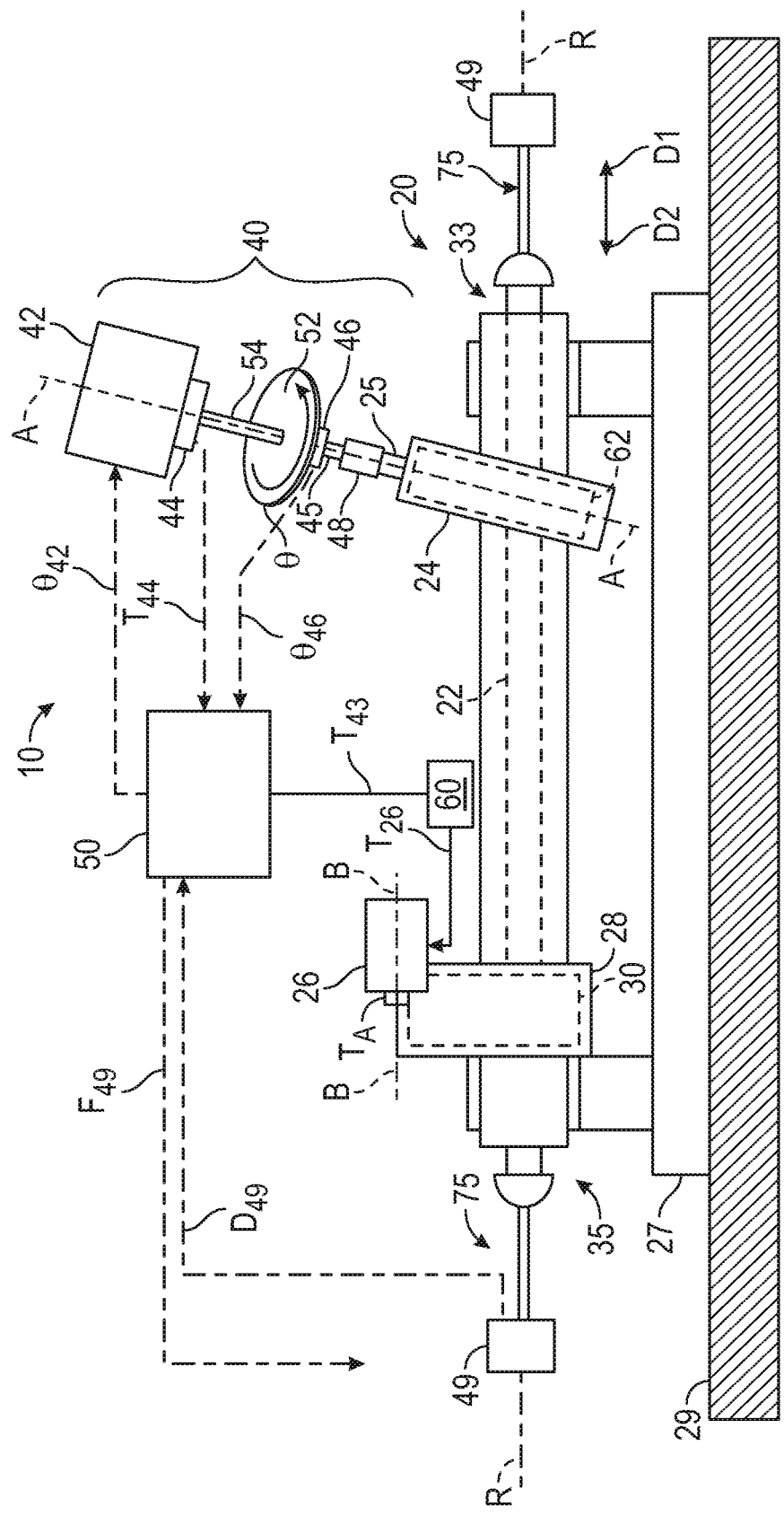
FIG. 1 is a schematic depiction of an exemplary test system for determining the frequency response of a power steering system according to an exemplary embodiment.

FIG. 1 is a schematic depiction of an exemplary steering test system 10 including a power steering system 20, control hardware 40, and a controller 50. The power steering system 20 may be utilized in a vehicle (not shown). The vehicle may be any self-propelled wheeled conveyance such as, but not limited to, a car, truck, sport utility vehicle, van, motor home, motorcycle, unmanned ground vehicle, etc., without departing from the scope of the present disclosure. In some embodiments, the vehicle may be a semi-autonomous or a fully autonomous vehicle. A fully autonomous vehicle may be self-maneuvering and capable of navigating in an environment without human input. The power steering system 20 of FIG. 1 includes an elongated toothed rack 22, a gear housing 24, a steering shaft 25, a steering assist motor 26, a drive housing 28, and a drive mechanism 30 positioned within the drive housing 28. The drive mechanism 30 is a speed reduction mechanism and may include devices such as, for example, gearing, chains, or belts.

The power steering system 20 may also be referred to as an electric power steering (EPS) system. An EPS system includes an electric motor (i.e., the steering assist motor 26) configured to generate an assist torque about an axis A-A of the steering shaft 25. The assist torque may reduce the overall effort required to turn a steering wheel (not shown) of the power steering system 20. In one embodiment, the power steering system 20 may include one or more additional steering controllers 60 such as, for example, an electronic control unit (ECU) for the steering assist motor 26. The controller 60 may be integrated in the steering assist motor 26 or remotely mounted within the vehicle (not shown). The controllers 50 and 60 are a non-generalized, electronic control device having a preprogrammed digital computer or processor, memory or non-transitory computer readable medium used to store data such as control logic, instructions, image data, lookup tables, etc., and a plurality of input/output peripherals or ports. The processors of both the controllers 50 and 60 are configured to execute the control logic or instructions.

The controller 60 is in electronic communication with the steering assist motor 26 via any wired connection such as, for example, a vehicle bus network. The controller 60 transmits a steering torque assist control signal $T_{26}$ that is received as input by the steering assist motor 26. The steering torque assist control signal $T_{26}$ indicates an amount of torque assist the steering assist motor 26 needs to generate when augmenting the mechanical force exerted upon the steering wheel (not shown) by a driver. Accordingly, in response to receiving the steering torque assist control signal $T_{26}$ the steering assist motor 26 generates an assist motor torque output $T_A$.

It is to be appreciated that the steering torque assist control signal $T_{26}$ and the assist motor torque output $T_A$ are both unknown values. Specifically, the algorithms for determining the steering torque assist control signal $T_{26}$ are stored in a memory of the controller 60. However, the controller 50 is unable to access the algorithms stored in the memory of the controller 60. That is, the algorithms stored in the memory of the controller 60 are unknown. As explained in greater detail below, the controller 50 is configured to determine a transfer function $L_1(s)$ that is representative of the response generated by the power steering system 20. The controller 50 determines the transfer function $L_1(s)$ by executing either the method 400 shown in FIG. 4 or the method 600 shown in FIG. 6 (the specific method is based on the configuration of the power steering system 20). Although the disclosure describes the controller 50 determining the transfer function $L_1(s)$, it is to be appreciated that in another embodiment a separate controller may be used to determine the transfer function $L_1(s)$.

In the non-limiting embodiment as shown in FIG. 1, the power steering system 20 is a belt-drive rack EPS system. However, it is to be appreciated that the power steering system 20 is not limited to the configuration as illustrated. Indeed, the power steering system 20 may be any other type of EPS system such as, for example, a single-pinion EPS system, a dual-pinion EPS system, or a column EPS system. It should also be appreciated that in some embodiments the power steering system 20 may be employed in a steer-by-wire system. Furthermore, in some embodiments the power steering system 20 may also be employed in a variety of different autonomous vehicles as well. For example, in one embodiment the power steering system 20 is part of a fully autonomous vehicle system that does not include manual controls such as a steering wheel.

Continuing to refer to FIG. 1, the rack 22 defines a first end portion 33 and a second end portion 35 that are disposed on opposite sides of the rack 22. The drive mechanism 30 and the drive housing 28 are positioned closer to the second end portion 35 of the rack 22 when compared to the first end portion 33, while the gear housing 24 is positioned closer to the first end portion 33 of rack 22 when compared to the second end of the rack 22. A motor axis B-B of the steering assist motor 26 is oriented relative to the drive mechanism 30 to facilitate electrical assist of a steering operation through the drive mechanism 30.

The gear housing 24 is positioned closer to the first end portion 33 of the rack 22 when compared to the second end portion 35 of the rack 22 and contains a rotatable pinion gear 62. The pinion gear 62 connects the rack 22 to the steering shaft 25. The pinion gear 62 is configured to translate in a back and forth motion along a linear axis R-R of the rack 22, where the direction of translation is indicated by a double-headed arrow labeled D1/D2. Specifically, the pinion gear 62 may translate in a first direction D1 along the linear axis R-R towards the first end portion 33 of the rack and in a second direction D2 towards the second end portion 35 of the rack 22.

The direction of translation of the pinion gear 62 is based on the rotation of the steering shaft 25. In other words, when a driver turns a steering wheel (not shown), this in turn will translate the pinion gear 62 along the rack 22 and to steer front wheels of a vehicle (not shown). For example, rotating the steering shaft 25 in a clockwise direction about the axis A-A may cause the pinion gear 62 to translate in the first direction D1, and rotation in the counterclockwise direction about the axis A-A may cause the pinion gear 62 to translate in the opposing second direction D2. The back and forth motion in directions D1 and D2 along the linear axis R-R moves the rack 22 in a corresponding direction to steer front wheels of a vehicle (not shown).

In some embodiments the steering assist motor 26 and the drive housing 28 may be positioned on or along the steering axis A-A to form a column or a pinion EPS system. In an embodiment, a column EPS system may also include a steering column and an intermediate shaft with the steering assist motor 26 delivering steering assist torque to a separate drive mechanism mounted adjacent the steering column. In contrast, a pinion EPS system may place the steering assist motor 26 adjacent to the gear housing 24 such that an assist torque acts directly on the rotatable pinion gear 62. Regardless of the specific type of steering configuration, a fixture 27 and a base plate 29 may be used to secure the power steering system 20 within a test environment.

The control hardware 40 includes a rotary actuator 42, a torque transducer 44, and a rotary encoder 46. The rotary actuator 42, torque transducer 44, and the rotary encoder 46 are each coaxially aligned with each other along the steering axis A-A. In one embodiment, the rotary actuator 42 may be an electric motor for producing torque about the steering axis A-A. The torque transducer 44, which is coupled to the rotary actuator 42, is any device configured to measure a torque experienced by the steering shaft 25 of the power steering system 20. It should be appreciated that axial variations may be present in the various components of the control hardware 40. Accordingly, in some embodiments an extension shaft 45 may be provided. The extension shaft 45 may be coupled to the steering shaft 25 by a set of flexible couplings 48 as shown. The flexible couplings 48 are configured to facilitate connection of the rotary actuator 42 to the steering shaft 25.

In addition to the extension shaft 45, the control hardware 40 may also include a compliant torsion bar 54 and an inertia wheel 52. Both the compliant torsion bar 54 and the inertia wheel 52 are co-axially arranged along the steering axis A-A. Together, the torsion bar 54 and inertia wheel 52 are configured to simulate the behavior of a steering column and intermediate shaft, couplings, and other components that are used to link a steering wheel (not shown) to the pinion gear 62. The resilience and inertia generated by the torsion bar 54 and the inertia wheel 52 may vary based on the specific type of power steering system 20 and are configured to simulate stiffness and inertia characteristics of portions of the power steering system 20 that are not included as part of the steering test system 10. In one non-limiting embodiment the torsion bar rates may range from 0.4 Nm/deg for a compliant part to 106 Nm/deg for a stiff part.

The compliant torsion bar 54 and the inertial wheel 52 connect the rotary actuator 42 to the steering shaft 25. The rotary actuator 42 imparts a steering input to the steering shaft 25 via the compliant torsion bar 54 and the inertial wheel 52. Specifically, the rotary actuator 42 exerts a steering wheel torque about the steering axis A-A of the steering shaft 25 based on a commanded steering angle $\theta_{42}$ received from the controller 50. The steering wheel torque is of a magnitude sufficient to substantially resist rotary motion about the steering axis A-A. Specifically, the rotary actuator 42 is actuated in into the commanded steering angle $\theta_{42}$ and maintains position by exerting the steering wheel torque. Since the steering shaft 25 is connected to the rotary actuator 25 through the compliant torsion bar 54 and inertial wheel 52, the steering shaft 25 is also positioned at the commanded steering angle $\theta_{42}$. In one embodiment, the commanded steering angle is zero degrees (0°), which represents the angle at which the steering wheel (not shown) is positioned. However, it is to be appreciated that the commanded steering angle $\theta_{42}$ is not limited to zero degrees. The rotary encoder 46 is configured to measure a steering angle $\theta_{46}$ of the steering shaft 25. The torque transducer 44 is configured to measure a steering output torque $T_{44}$. Both the steering angle $\theta_{46}$ and the steering output torque $T_{44}$ are monitored by the controller 50.

The power steering system 20 also includes at least one actuator 49 coupled to the rack 22. The at least one actuator 49 is configured to actuate the rack 22 in a substantially linear direction. Specifically, the actuator 49 is configured to apply a rack disturbance force upon the rack 22, where the rack disturbance force actuates the rack 22. The rack disturbance force is applied in a substantially linear direction. That is, the rack disturbance force is substantially parallel with respect to the linear axis R-R of the rack 22. The controller 50 is in electronic communication via any wired or wireless connection with each of the actuators 49, the rotary actuator 42, the torque transducer 44, and the rotary encoder 46.

In the non-limiting embodiment as shown in FIG. 1, two actuators 49 are provided. Specifically, a first actuator 49 is disposed on the first end portion 33 of the rack 22 and a second actuator 49 is disposed on the second end portion 35 of the rack 22. The first actuator 49 and the second actuator 49 are each connected to a respective tie rod 75 of a vehicle (not shown). In one example, one of the actuators 49 may apply a rack force input and the remaining actuator 49 may provide reaction forces. The reaction force may represent, for example, an interaction between the tires of a vehicle (not shown) and a road surface. Although the steering test system 10 is illustrated as having two actuators 49, it is to be appreciated that in some embodiments only one actuator may be used instead.

The controller 50 transmits a rack disturbance force control signal $F_{49}$ to the actuators 49. In response to receiving the rack disturbance force control signal $F_{49}$, the actuators 49 exert the rack disturbance force upon the rack 22. Specifically, the rack disturbance force is exerted upon the rack 22 along the axis R-R of the rack 22, where the frequency of the rack disturbance force is varied while performing a frequency sweep. As explained below, the frequency sweep excites the control hardware 40 by varying the frequency of the rack disturbance force. The controller 50 varies the frequency of the rack disturbance force control signal $F_{49}$ while the amplitude of the rack disturbance force is kept at a constant value. The amplitude of the rack disturbance force represents magnitude. For example, in some embodiments the amplitude may be measured in Newtons. Furthermore, the frequency of the rack disturbance force control signal $F_{49}$ is evaluated over a plurality of amplitude values.

The rack disturbance force applied to the rack 22 is in the form of a variable waveform. For example, the variable waveform may be a sinusoidal wave, a white noise signal, or a multi-sine signal. White noise may contain frequencies ranging from about 5 to about 30 Hertz in equal amounts, and a multi-sine wave is a periodic signal that is composed of a harmonically related sum of sinusoid components.

The frequency sweep is indicative of the frequency response of the power steering system 20 at different amplitude values (i.e., at different forces). In one exemplary embodiment, the rack disturbance force applied to the rack 22 is a sinusoidal wave having an amplitude of about 400 Newtons and a frequency of about 5 Hertz lasting about eight seconds and is followed by an amplitude of 400 Newtons at 5.5 Hertz for eight seconds. The frequency sweep may continue by incrementing the frequency at about 0.5 Hertz until the frequency value reaches about 30 Hertz. Another sweep may then be executed at other amplitude values such as, for example, 600 Newtons, 800 Newtons, and 1,000 Newtons. The controller 50 may record the data as the frequency sweep is performed either discreetly or continuously. As shown in FIGS. 3A and 3B, the magnitude (FIG. 3A) and phase (FIG. 3B) of the frequency response generated by the power steering system 20 may be used to determine other attributes of the power steering system 20 such as, but not limited to, gain margin, phase margin, and stability margin.

Figure 2:
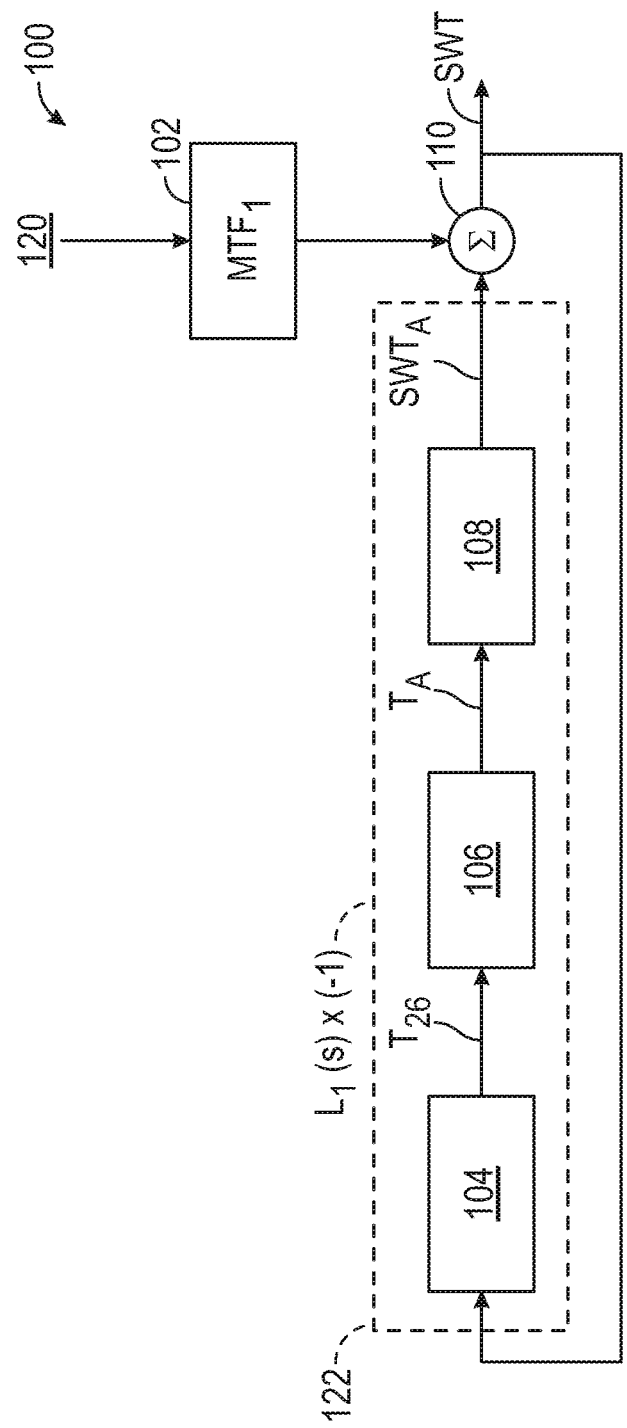
FIG. 2 is a control system diagram of the power steering system shown in FIG. 1 according to an exemplary embodiment.

FIG. 2 depicts the steering system 20 shown in FIG. 1 as a control system 100. The control system 100 receives as input a rack disturbance force 120. The rack disturbance force 120 represents the axial force exerted by the actuators

Figure 5:
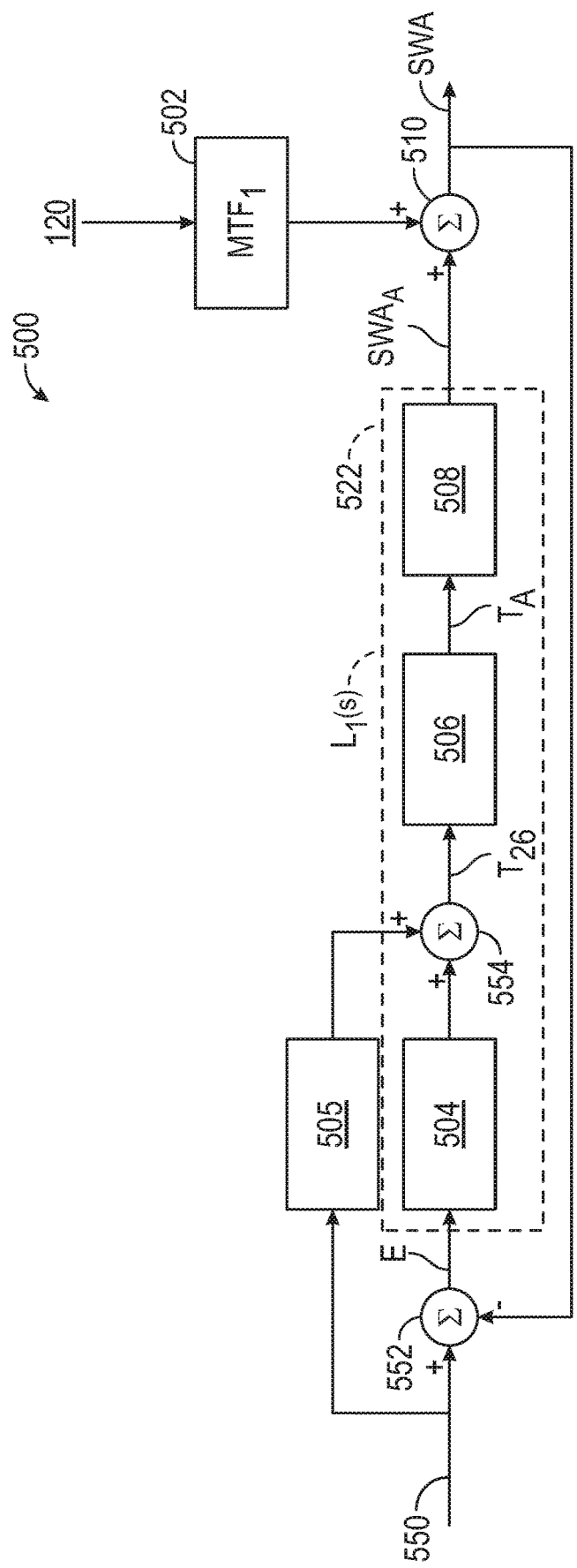
FIG. 5 is a control system diagram of a power steering system employed in a steer-by-wire or an autonomous vehicle according to an exemplary embodiment.

49 (FIG. 1) in response to receiving the rack disturbance force control signal $F_{49}$ (FIG. 1). In the embodiment as shown in FIG. 2, the control system 100 represents any EPS system that may be found in vehicles that does not employ steer-by-wire or autonomous control. Instead, as explained below and as shown in FIG. 5, a closed-loop position control system 500 including a feedforward controller is used to represent an EPS system that can be found in a steer-by-wire or an autonomous vehicle.

Referring to both FIGS. 1 and 2, the predetermined assist torque control algorithm stored in the controller 60 (FIG. 1), which is indicated by block 104 in FIG. 2, determines the steering torque assist control signal $T_{26}$. The steering assist motor 26 (including a control algorithm indicated by block 106 in FIG. 2) generates the assist motor torque $T_A$ based on the steering torque assist control signal $T_{26}$. The assist motor torque $T_A$ is converted mechanically, through the drive mechanism 30 and other mechanical components of the power steering system 20, to the steering wheel assist torque $SWT_A$. The mechanical transfer function from the assist motor torque $T_A$ to the steering wheel assist torque $SWT_A$ is represented by block 108 in FIG. 2. The control algorithms and mechanical properties represented by blocks 104, 106 and 108 are unknown.

A mechanical transfer function $MTF_1$ with the rack disturbance force 120 as input is represented by block 102. The output of the mechanical transfer function $MTF_1$ is combined with the steering wheel assist torque $SWT_A$ from block 108 at a summing junction 110 to create an output of the power steering system 20. Specifically, the output is a steering wheel torque (SWT). The steering wheel torque SWT represents an internal steering wheel torque created by the rack disturbance forces. The steering wheel torque SWT is unknown so the steering output torque $T_{44}$ (FIG. 1) may be used as an approximation.

The mechanical transfer function $MTF_1$ is based on the steering assist motor 26 being deactivated. Specifically, the steering assist motor 26 is deactivated such that no torque is generated. For example, in one approach the steering assist motor 26 may be deactivated by turning the power supply off. The mechanical transfer function $MTF_1$ is calculated by the controller 50 by deactivating the steering assist motor 26 and applying the rack disturbance force by the actuators 49. In other words, the mechanical transfer function $MTF_1$ represents the effect or impact of the rack disturbance force on the steering wheel torque SWT (i.e., steering output torque $T_{44}$), and is expressed in Equation 1 as:

$$RDF2SWT_{na}(s) = MTF_1(s) = \frac{SWT_{na}(s)}{RDF_{na}(s)} \quad \text{Equation 1}$$

where $RDF2SWT_{na}(s)$ represents an estimated transfer function from the rack disturbance force to the steering wheel torque SWT with no assistance from the assist motor 26, $SWT_{na}$ is the steering wheel torque without assistance from the steering assist motor 26, $RDF_{na}$ is a rack disturbance force without assistance from the steering assist motor 26, and the variable s is the Laplace variable.

Once the mechanical transfer function $MTF_1$ is calculated, the controller 50 determines an estimated transfer function from the rack disturbance force to the steering wheel torque SWT when the steering assist motor 26 is activated. That is, a frequency sweep with the steering assist motor 26 activated is first performed. The controller 50 then calculates Equation 2, which is:

$$RDF2SWT_{wa}(s) = \frac{SWT_{wa}(s)}{RDF_{wa}(s)} \quad \text{Equation 2}$$

where $RDF2SWT_{wa}(s)$ represents an estimated transfer function from the rack disturbance force to the steering wheel torque SWT with the assist motor 26 activated, $SWT_{wa}$ is the steering wheel torque with the steering assist motor 26 activated, $RDF_{wa}$ is a rack disturbance force with the steering assist motor 26 activated, and the variable s is the Laplace variable. The transfer function may be estimated using a MATLAB function such as tfestimate, fast Fourier Transform, or other suitable techniques. The process for calculating the transfer function $L_1(s)$ is described in greater detail below.

In the embodiment as illustrated in FIG. 2, the control system 100 is a feedback system. In other words, the output (i.e., the steering wheel torque SWT) is fed back into the input (i.e., the predetermined assist torque control algorithm 104). The controller 50 (FIG. 1) executes the predetermined assist torque algorithm 104 to determine the assist torque control signal $T_{26}$. The predetermined assist torque algorithm 104 calculates the assist torque control signal $T_{26}$ based on the last value of the steering wheel torque SWT. The open-loop system is indicated by a dashed box 122 in FIG. 2 that is labeled $[L_1(s) \times (-1)]$. In other words, the open-loop system 122 is equal to the negative value of the transfer function $L_1(s)$. Referring to both FIGS. 1 and 2, the transfer function $L_1(s)$ is determined by Equation 3 as follows:

$$L_1(s) = \frac{RDF2SWT_{na}(s)}{RDF2SWT_{wa}(s)} - 1 \quad \text{Equation 3}$$

That is, the transfer function $L_1(s)$ is determined by dividing the transfer function $RDF2SWT_{na}(s)$ with the transfer function $RDF2SWT_{wa}(s)$ to determine a quotient, and then subtracting the value one from the quotient. The negative value of the transfer function $L_1(s)$ represents the transfer function of the three blocks of the open-loop system 122, namely the predetermined assist torque control algorithm or block 104, the steering assist motor with its control algorithm or block 106, and the mechanical transfer function from the assist motor torque $T_A$ to the steering wheel assist torque $SWT_A$ or block 108.

FIG. 3A illustrates an exemplary magnitude response and FIG. 3B illustrates an exemplary phase response of the power steering system 20 shown in FIG. 1. The frequency response of the power steering system 20 (FIG. 1) is a measure of the magnitude and the phase of the output (i.e., the steering wheel torque SWT) as a function of frequency, in comparison to the input (i.e., the rack disturbance force.) The solid and dashed lines represent an estimated or calculated frequency response of various implementations of the power steering system 20.

Referring to FIGS. 1, 3A, and 3B, an exemplary frequency sweep was conducted at frequencies ranging from about 5 to about 30 Hertz and at amplitudes of about 400, 600, 800, and 1,000 Newtons. Furthermore, the frequency sweep was conducted with and without the steering assist motor 26 activated. In other words, the controller 50 determines the rack disturbance force control signal $F_{49}$ required to generate a first frequency sweep. The steering assist motor 26 is deactivated during the first frequency sweep. For example, the controller 60 may be deactivated or turned off while the first frequency sweep is performed. The controller 50 also determines the rack disturbance force control signal $F_{49}$ required to generate a second frequency sweep. The second frequency sweep is conducted in a similar manner as the first frequency sweep, however the steering assist motor 26 is now activated.

FIG. 3A illustrates a peak response 198, which represents the peak amplitude value of the magnitude. In the example as shown, the peak amplitude values range from about 15 to about 19 decibels (dB). Both the magnitude response in FIG. 3A and the phase response shown in FIG. 3B also include an attenuated response 202. In some embodiments, the attenuated response 202 may be created by a notch filter.

Figure 3C:
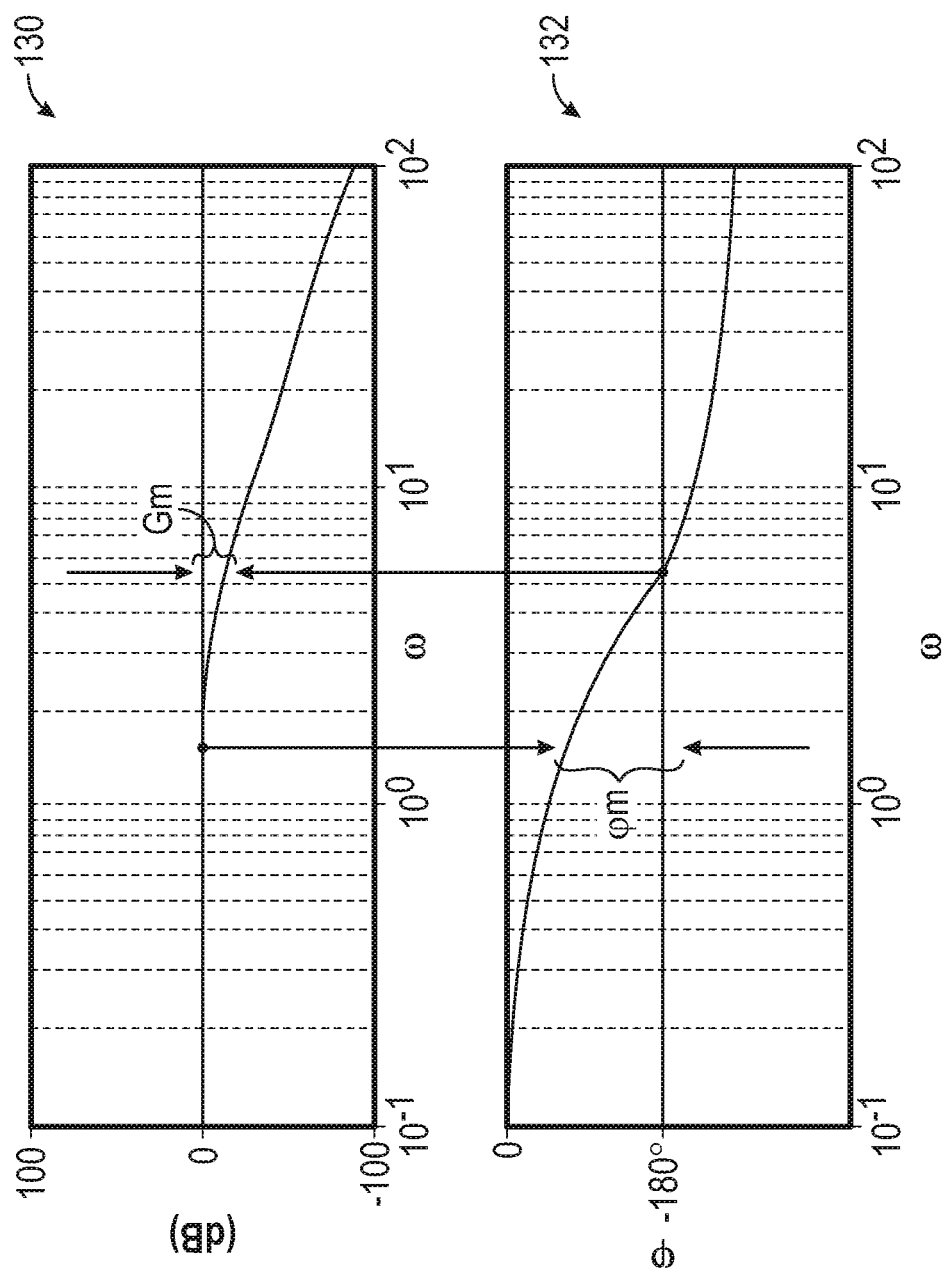
FIG. 3C is a graph of a Bode plot providing an explanation as to how a gain margin and phase margin for a system are determined based on the magnitude and phase response according to an exemplary embodiment.

Once the transfer function $L_1(s)$ is determined, other attributes of the power steering system 20 (FIG. 1) may be estimated such as, but not limited to, the gain margin, phase margin, and stability margin. Systems having a higher gain margin and phase margin are capable of withstanding greater changes in system parameters before becoming unstable. Turning now to FIG. 3C, a diagram illustrating an exemplary magnitude graph 130 and phase graph 132 are provided to demonstrate how the gain margin and phase margin of a system are calculated. The magnitude graph 130 illustrates a gain margin $G_m$, and the phase graph 132 illustrates a phase margin $\varphi_m$.

The gain margin $G_m$ represents an additional amount of gain required for the magnitude (usually measured in dB) to reach 0 when the system's phase is −180 degrees. That is, the controller 50 (FIG. 1) determines the gain margin $G_m$ of the power steering system 20 by calculating an additional amount of gain required for the magnitude to be 0 dB when the phase of the power steering system 20 is −180 degrees. The controller 50 determines the phase margin $\varphi_m$ of the power steering system 20 by calculating the amount of phase lag required for the power steering system 20 to be −180 degrees when the magnitude is 0 decibels.

The Nyquist stability criterion is a graphical technique for determining the stability of a feedback control system. The technique includes creating a Nyquist plot that is used to determine the gain margin, the phase margin, and the stability margin. The controller 50 determines the gain margin $G_m$ as the smallest gain increase to create an encirclement around a critical point. The Nyquist plot also includes the phase margin $\varphi_m$, which is drawn as the smallest change in phase to create an encirclement around the critical point. The critical point is shown as −1 on the Nyquist plot.

The stability margin may also be calculated based on the Nyquist plot. Specifically, the stability margin is the shortest distance to −1 on the Nyquist plot. Although the gain margin, phase margin, and stability margin are described, the controller may determine other attributes of the power steering system 20 such as, for example, disturbance rejection performance and bandwidth.

Figure 4:
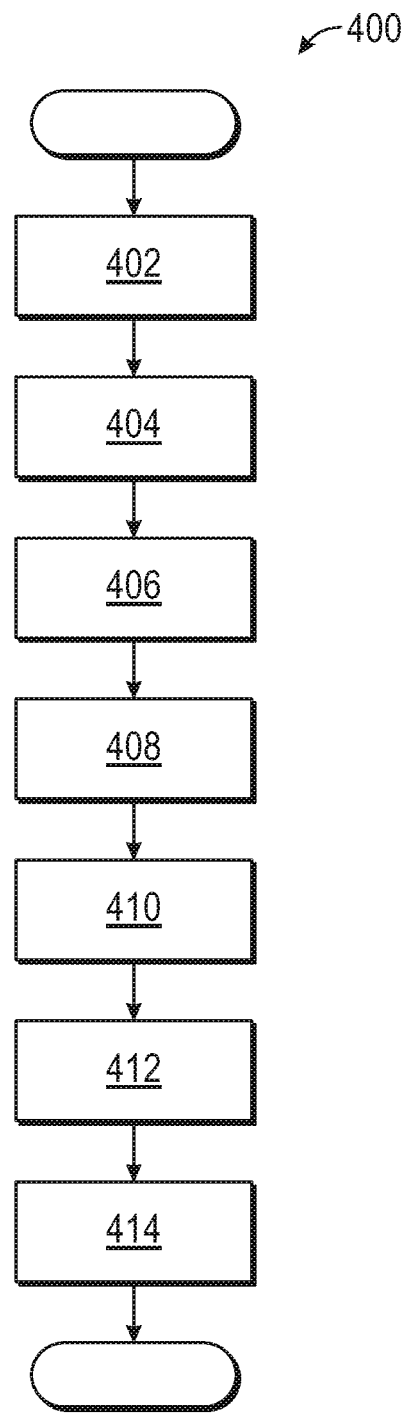
FIG. 4 is a process flow diagram for determining the response of the power steering system shown in FIG. 1 according to an exemplary embodiment.

FIG. 4 is a process flow diagram illustrating an exemplary method 400 for determining the transfer function $L_1(s)$ (shown in FIG. 2) that indicates the response generated by the power steering system 20. Referring generally to FIGS. 1, 2, and 4, the method begins at block 402. In block 402, the controller 50 transmits the commanded steering angle $\theta_{42}$ to the rotary actuator 42. The method 400 may then proceed to block 404.

In block 404, in response to receiving the commanded steering angle $\theta_{42}$ from the controller 50, the rotary actuator 42 is actuated to the commanded steering angle $\theta_{42}$ and maintains position by exerting the steering wheel torque. As mentioned above, since the steering shaft 25 is connected to the rotary actuator 42 through the compliant torsion bar 54 and inertial wheel 52, the steering shaft 25 is also positioned at the commanded steering angle $\theta_{42}$. The method 400 may then proceed to block 406.

In block 406, the controller 50 transmits the rack disturbance force control signal $F_{49}$ to the actuators 49. The method 400 may then proceed to block 408.

In block 408, in response to receiving the rack disturbance force control signal $F_{49}$, the actuators 49 generate the rack disturbance force that is exerted upon the rack 22. As explained above, the controller 50 determines the rack disturbance force control signal $F_{49}$ required to generate the first frequency sweep, where the steering assist motor 26 is deactivated. The controller 50 also determines the rack disturbance force control signal $F_{49}$ required to generate the second frequency sweep, where the steering assist motor 26 is activated. The method 400 may then proceed to block 410.

In block 410, the controller 50 monitors the torque transducer 44 for the steering output torque $T_{44}$, which is a measured value. As mentioned above, the steering output torque $T_{44}$ approximates the steering wheel torque SWT shown in FIG. 2. The method 400 may then proceed to block 412.

In block 412, the controller 50 determines the transfer function $L_1(s)$ based on the steering output torque $T_{44}$ observed by the torque transducer 44 during the first frequency sweep and the second frequency sweep. The steering output torque $T_{44}$ indicates the response of the power steering system 20. The transfer function $L_1(s)$ is determined based on Equation 3, which is described above. The method 400 may then proceed to block 414.

In block 414, the controller 50 determines the gain margin $G_m$ and the phase margin $\varphi_m$ based on the magnitude response and the phase response. As mentioned above, the stability margin is determined based on a Nyquist plot of the gain margin $G_m$ and the phase margin $\varphi_m$. The method 400 may then terminate.

Turning now to FIG. 5, the closed-loop position control system 500 including feedforward control is shown. It is to be appreciated that the system shown in FIG. 2 is based on an EPS system with an intermediate shaft connecting the steering column with the rack. In contrast, steer-by-wire systems do not have an intermediate shaft. That is, there is no physical connection between the steering column and rack. Instead, a steering column equipped with emulation capabilities or a steering emulator may provide steering feedback to a driver through a connected steering wheel. For a steer-by-wire system, the steering emulator input shaft is connected to the control system 40 shown in FIG. 1, in place of the steering shaft 25 of a traditional EPS system. Some autonomous vehicles may also use steer-by-wire technology as well. The control system 500 represents a steer-by-wire system having no physical connection between the steering column and rack.

Still referring to FIG. 5, the control system 500 includes a predetermined position control algorithm 504 stored in the controller 60 (FIG. 1), which is based on feedback control. In one embodiment, an additional feedforward algorithm 505 may also be included as well. Instead of measuring the steering wheel torque SWT as the output of the power steering system 20 (FIG. 1), the control system 500 measures a steering angle SWA. The steering angle SWA is the steering angle $\theta_{46}$ measured by the rotary encoder 46 in FIG. 1. In another embodiment, the steering angle SWA may be obtained from sensors (not shown) located along the steering axis A-A of the steering shaft 25 or, alternatively, by an indirect approach based on rack position signals along the axis R-R of the rack 22 (FIG. 1).

In the embodiment as illustrated in FIG. 5, an input 550 indicating a commanded steering angle is provided to the control system 500. In an embodiment, the input 550 may be an autonomous command for maneuvering and navigating a vehicle. The autonomous command may be transmitted from the controller 50 to the controller 60 through a communication link $T_{43}$ as shown in FIG. 1. Alternatively, the input 550 may be generated by a driver manipulating a steering wheel (not shown). It is to be appreciated that sometimes the input 550 may be zero. In other words, the autonomous command is to hold steering wheel at zero degrees. Alternatively, in the event the vehicle is not autonomously controlled, this means that the driver is not moving the vehicle's steering wheel.

The input 550 is combined with the steering angle SWA at a junction 552. The difference between the steering angle SWA measured by the rotary encoder 46 and the input 550 represents the error E in the control system 500. In other words, the actual steering angle SWA is compared to the commanded steering angle to determine the error E. As seen in FIG. 5, the error E is then provided to the assist torque control algorithm 504.

The output of both the position control algorithm 504 and the feedforward algorithm 505 are combined at a summing junction 554. The sum of the output of both algorithms 504 and 505 creates the steering torque assist control signal $T_{26}$. As mentioned above, the steering assist motor 26 generates the assist motor torque $T_A$ (the steering assist motor 26 including a corresponding control algorithm is represented by block 506 in FIG. 5) based on the steering torque assist control signal $T_{26}$. The assist motor torque $T_A$ generates, through the drive mechanism 30 and other mechanical components of the power steering system 20, the steering wheel assist angle $SWA_A$. The mechanical transfer function from the assist motor torque $T_A$ to the steering wheel assist angle $SWA_A$ is represented by block 508 in FIG. 5.

The response of the control system 500 is based on the transfer function $L_1(s)$ (shown in FIG. 5) and the effects of the feedforward block 505 upon the steering angle SWA. Referring to both FIGS. 1 and 5, the first mechanical transfer function $MTF_1$ is based on the rack disturbance force 120 and is indicated by block 502. The output of the mechanical transfer function $MTF_1$ and the steering wheel assist angle $SWA_A$ from block 508 are combined at a summing junction 510 to create the steering angle SWA. The steering angle SWA represents the angular displacement of the steering shaft 25 in response to the rack disturbance force applied to the rack 22 by the actuators 49. In other words, although the rotary actuator 42 maintains its position and the shaft 25 is connected to the rotary actuator via the compliant torsion bar 54 and the inertial wheel 52, some rotation may still occur in response to exerting the rack disturbance force 102. In one embodiment, the steering shaft 25 may rotate about 3.5 degrees.

The mechanical transfer function $MTF_1$ is based on the steering assist motor 26 being deactivated and is expressed in Equation 4 as:

$$RDF2SWA_{na}(s) = MTF_1(s) = \frac{SWA_{na}(s)}{RDF_{na}(s)} \qquad \text{Equation 4}$$

where $RDF2SWA_{na}(s)$ represents an estimated transfer function from the rack disturbance force to the steering angle SWA with no assistance from the assist motor 26, $SWA_{na}$ is the steering angle without assistance from the steering assist motor 26, and $RDF_{na}$ is a rack disturbance force without assistance from the steering assist motor 26.

Before the transfer function $L_1(s)$ is determined, the controller 50 determines an estimated transfer function from the rack disturbance force to the steering angle SWA when the steering assist motor 26 is activated and the input 550 is zero. That is, a frequency sweep with the steering assist motor 26 activated is first performed. The controller 50 then calculates Equation 5, which is:

$$RDF2SWA_{wa}(s) = \frac{SWA_{wa}(s)}{RDF_{wa}(s)} \qquad \text{Equation 5}$$

where $RDF2SWA_{wa}(s)$ represents an estimated transfer function from the rack disturbance force to the steering angle SWA with the assist motor 26 activated, $SWA_{wa}$ is the steering angle SWA with the steering assist motor 26 activated, and $RDF_{wa}$ is a rack disturbance force with the steering assist motor 26 activated. The transfer function $L_1(s)$ is determined by Equation 6 as follows:

$$L_1(s) = \frac{RDF2SWA_{na}(s)}{RDF2SWA_{wa}(s)} - 1 \qquad \text{Equation 6}$$

That is, the open-loop transfer function $L_1(s)$ is determined by dividing the transfer function $RDF2SWA_{na}(s)$ with the transfer function $RDF2SWA_{wa}(s)$ to determine a quotient, and then subtracting the value one from the quotient. The transfer function $L_1(s)$ represents the three blocks of the open-loop system 522, namely the predetermined position control algorithm 504, the steering assist motor with its control algorithm or block 506, and the mechanical transfer function from the assist motor torque $T_A$ to the steering wheel assist angle $SWA_A$ or block 508.

Once the transfer function $L_1(s)$ for the open-loop system 522 is determined, the controller 50 then identifies the feedforward effects upon the steering angle SWA. The controller 50 identifies the feedforward control algorithm 505 by first disconnecting the actuators 49. The controller 50 then monitors the rotary encoder 46 to determine the effects of the feedforward algorithm 505 upon the steering angle SWA. This means that the only input that the control system 500 receives is the input 550. In other words, to determine the effects of the feedforward control algorithm 505, the rack disturbance force 120 is set to zero and the control system 500 only receives the input 550. It is to be appreciated that the actual value of the feedforward algorithm 505 is not required.

An approach to determine the effects of the feedforward algorithm 505 on the power steering system 20 will now be described in greater detail. It is to be appreciated that a perfect or ideal feedforward control would result in the product of the transfer functions for blocks 505, 506, and 508 to equal one (505×506×508=1). An ideal feedforward algorithm 505 is one where a corresponding transfer function is the invert of the product of the transfer functions for blocks 506 and 508, therefore the steering angle SWA follows the input 550 exactly and the error E is zero. To determine the product of the transfer functions for blocks 505, 506, and 508 and thereby the effects of the feedforward algorithm 505, a third frequency sweep is performed. The third frequency sweep may also be referred to as a steering angle frequency sweep.

The controller 50 first determines the steering angle command signal required to generate the steering angle frequency sweep. The steering angle frequency sweep is conducted by transmitting the steering angle command signal for the steering angle frequency sweep, as the input 550 to the control system 500 (FIG. 5), from the controller 50 to the controller 60 through the communication link T43 (FIG. 1) while the steering assist motor 26 is activated. The controller 50 determines an estimated transfer function from the steering angle command 550 to the steering angle SWA, which is denoted as $Cmd2SWA_{FF}(s)$, and is based on the steering angle $\theta_{46}$ measured by the rotary encoder 46. The estimated transfer function $Cmd2SWA_{FF}(s)$ from the steering angle command 550 to the steering angle SWA is determined in Equation 7 as:

$$Cmd2SWA_{FF}(s) = \frac{SWA_{ff}(s)}{550_{ff}(s)}  \qquad \text{Equation 7}$$

where $SWA_{ff}$ is the steering angle with the steering assist motor 26 activated and actuator 49 disconnected, and $550_{ff}$ is the commanded steering angle with the steering assist motor 26 activated and the actuators 49 disconnected. A transfer function representing the product of the transfer functions for the blocks 505, 506, and 508 is then determined by Equation 8 as follows:

$$505 \times 506 \times 508(s) = Cmd2SWA_{FF}(s) \times [1 + L_1(s)] - L_1(s) \qquad \text{Equation 8}$$

As seen in FIG. 5, the feedforward control algorithm 505 is in series with block 506 (which represents the steering assist motor 26 in FIG. 1 including its control algorithm) and block 508 (which represents the mechanical transfer function from the assist motor torque output $T_A$ in FIG. 1) to the steering wheel assist angle $SWA_A$. Once the feedforward effects are determined, then the controller 50 may determine other attributes of the power steering system 20 such as, for example, the gain margin, phase margin, and stability margin, which are described above. Other attributes such as bandwidth and steering angle tracking performance may be determined as well.

Therefore, it is to be appreciated that a first frequency sweep, a second frequency sweep, and the steering angle frequency sweep (also referred to as the third frequency sweep) are to be performed for a steer-by-wire or an autonomous steering system. The first frequency sweep and the second frequency sweeps are both performed by the rack actuators 49 (which are shown in FIG. 1). The steering assist motor 26 is deactivated and the rotary actuator 42 is disengaged during the first frequency sweep. The steering assist motor 26 is activated while performing the second frequency sweep. Specifically, during the second frequency sweep the rotary actuator 42 is engaged and the commanded steering angle $\theta_{42}$ commanded to maintain its present value when a steer-by-wire system is employed. However, if the steering system 20 is for autonomous operation, then the rotary actuator 42 is disengaged and the commanded steering angle $\theta_{42}$ (which is communicated through the communication link $T_{43}$ is set to zero.

In contrast, the steering angle frequency sweep does not employ the rack actuators 49. Instead, the steering angle frequency sweep is based on modifying the commanded steering angle $\theta_{42}$. Modifying the commanded steering angle $\theta_{42}$ is similar to modifying the rack disturbance force, except that the peak angular amplitudes may be about 15°, 30°, and 90°. It is to be appreciated that the peak amplitudes may be reduced based on a maximum angular speed for any given frequency. For example, the maximum angular speed may be capped at 500°/s so that the peak amplitude is limited to 500/(2πf), where f is frequency. It is also to be appreciated that the rack actuator 49 is not simply deactivated but is disengaged (i.e., physically disconnected from the system). This ensures no disturbances are transmitted, and that the force is a zero value.

It is to be appreciated that the present disclosure describes a total of five frequency sweeps. That is, two frequency sweeps are performed to determine the frequency response of an EPS system that does not employ steer-by-wire or autonomous control (i.e., the embodiment as shown in FIG. 2). Three frequency sweeps are described to determine the frequency response of an EPS system that is part of a steer-by-wire or autonomous vehicle (i.e., the embodiment as shown in FIG. 5). Specifically, it is to be appreciated that the first frequency sweep, the second frequency sweep, and the steering angle frequency sweep are to be performed for a steer-by-wire or an autonomous steering system.

The frequency sweeps for the embodiments as described in both FIGS. 2 and 5 (i.e., an EPS system that does not employ steer-by-wire or autonomous control as well as an EPS system that is part of a steer-by-wire or autonomous vehicle) that involve the steering assist motor 26 being activated may be performed at various vehicle speeds. For example, the frequency sweeps may be performed at 0 kph and at 100 kph. This is because the system response may vary based on calibration differences. A simulated vehicle speed signal may be sent from the controller 50 through the communication link $T_{43}$ to the controller 60 to set various levels of calibrated assist.

Figure 6:
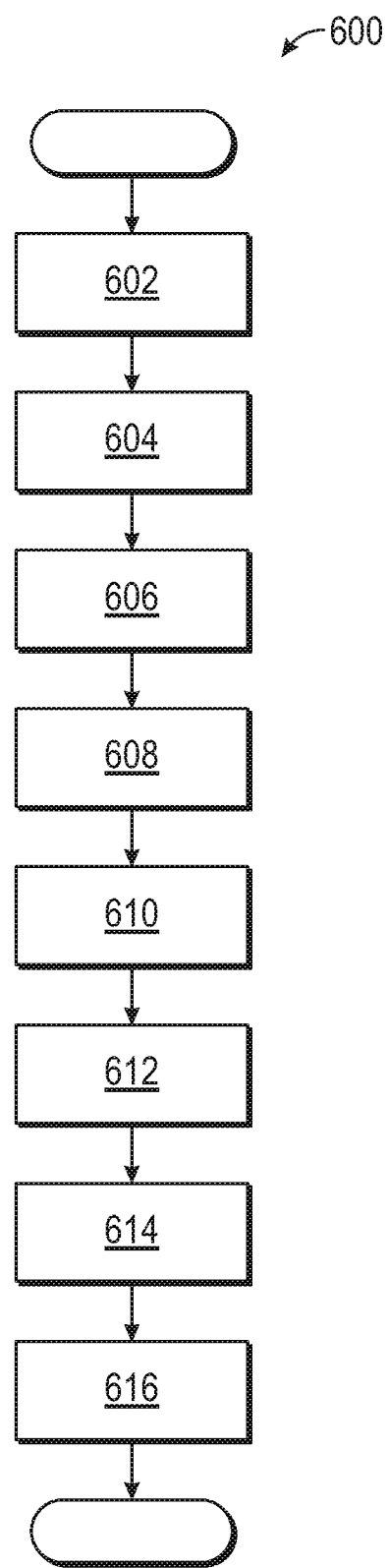
FIG. 6 is a process flow diagram for determining the response of the power steering system shown in FIG. 5 according to an exemplary embodiment.

FIG. 6 is a process flow diagram illustrating an exemplary method 600 for determining the transfer function $L_1(s)$ and the effects of the feedforward algorithm 505 of the control system 500 in FIG. 5. Referring generally to FIGS. 1, 5, and 6, the method begins at block 602. In block 602, the controller 60 may receive a non-zero value as the input 550 from the controller 50. As mentioned above, in some embodiments the input 550 may be zero (i.e., holding steering wheel at a zero degree angle). In other words, block 602 is optional. The method 600 may then proceed to block 604 or, for autonomous vehicles without a steering wheel, block 608.

In block 604, the controller 50 transmits the commanded steering angle $\theta_{42}$ to the rotary actuator 42. The method 600 may then proceed to block 606.

In block 606, in response to receiving the commanded steering angle $\theta_{42}$ from the controller 50, the rotary actuator 42 is actuated to the commanded steering angle $\theta_{42}$ and maintains position by exerting the steering wheel torque. The method 600 may then proceed to block 608.

In block 608, the controller 50 transmits the rack disturbance force control signal $F_{49}$ to the actuators 49. The method 600 may then proceed to block 610.

In block 610, in response to receiving the rack disturbance force control signal $F_{49}$, the actuators 49 generate the rack disturbance force that is exerted upon the rack 22. As explained above, the controller 50 determines the rack disturbance force control signal $F_{49}$ required to generate the first frequency sweep. The steering assist motor 26 is deactivated during the first frequency sweep, and the rotary actuator 42 is disengaged. The controller 50 also determines the rack disturbance force control signal $F_{49}$ required to generate the second frequency sweep, where the second frequency sweep is described above. The method 600 may then proceed to block 612.

In block 612, the controller 50 monitors the rotary encoder 46 for the steering angle SWA. The method 600 may then proceed to block 614.

In block 614, the controller 50 determines the transfer function $L_1(s)$ based on the steering angle SWA observed by the rotary encoder 46 during the first frequency sweep and the second frequency sweep. The method 600 may then proceed to block 616.

In block 616, the controller 50 determines the effects of the feedforward control algorithm 505. It is to be appreciated that block 616 is optional. Specifically, if the input 550 is zero, then block 616 may be omitted. The effects of the feedforward control algorithm 505 may be determined based on the third frequency sweep, which is also referred to as the steering angle frequency sweep. Once the effects of the feedforward algorithm 505 are determined the method 600 may terminate.

Referring generally to the figures, the disclosed system and method provide various technical effects and advantages for determining the frequency response of the power steering system. Specifically, the disclosed approach does not require access to the control algorithms used to calculate the assist torque generated by the steering assist motor when determining the frequency response. Systems and methods that are presently available for determining the frequency response of a power steering system typically require knowledge of the algorithms for controlling the steering assist motor. In the event the algorithms are not accessible, then an alternative approach involves measuring the mechanical properties of each component. However, measuring all the steering system components may become time-consuming and tedious. In contrast, the disclosed system and method determine the response of the power steering system by applying a disturbance force to the steering rack and determine the frequency response of the power steering system. Thus, unlike some steering systems presently available, the disclosed system does not require access to the various algorithms for controlling the steering assist motor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of determining a frequency response of a power steering system including a steering assist motor configured to generate an assist torque about an axis of a steering shaft when activated, the method comprising:
   transmitting, by a controller, a commanded steering angle to a rotary actuator connected to the steering shaft;
   in response to receiving the commanded steering angle, actuating the rotary actuator to the commanded steering angle, wherein the rotary actuator maintains position by exerting a steering wheel torque and the steering shaft is connected to the rotary actuator by a compliant torsion bar and inertial wheel;
   transmitting, by the controller, a rack disturbance force control signal to at least one actuator, wherein the at least one actuator is coupled to a rack and configured to apply a rack disturbance force on the rack in a substantially linear direction;
   in response to receiving the rack disturbance force control signal, generating a first frequency sweep and a second frequency sweep by the at least one actuator, wherein the steering assist motor is deactivated during the first frequency sweep and activated during the second frequency sweep;
   monitoring, by the controller, a torque transducer that measures a steering output torque of the steering shaft experienced during the first frequency sweep and the second frequency sweep; and
   determining, by the controller, a transfer function based on the steering output torque monitored during the first frequency sweep and the second frequency sweep, wherein the transfer function indicates the frequency response by the power steering system.

2. The method of claim 1, further comprising determining the transfer function by:
   calculating, by the controller, a mechanical transfer function based on the steering output torque measured during the first frequency sweep.

3. The method of claim 2, further comprising determining the mechanical transfer function based on:

$$RDF2SWT_{na}(s) = MTF_1(s) = \frac{SWT_{na}(s)}{RDF_{na}(s)}$$

wherein $RDF2ST_{na}(s)$ is an estimated transfer function from the rack disturbance force to the steering wheel torque without assistance from the steering assist motor, $SWT_{na}$ is the steering wheel torque without assistance from the steering assist motor, and $RDF_{na}$ is the rack disturbance force without assistance from the steering assist motor.

4. The method of claim 3, further comprising determining an estimated transfer function from the rack disturbance force to the steering wheel with assistance from the steering assist motor by:

$$RDF2SWT_{wa}(s) = \frac{SWT_{wa}(s)}{RDF_{wa}(s)}$$

wherein $RDF2SWT_{wa}(s)$ represents an estimated transfer function from the rack disturbance force to the steering wheel with assistance from the assist motor, $SWT_{wa}$ is the steering wheel torque with the steering assist motor activated, and $RDF_{wa}$ is a rack disturbance force with the steering assist motor activated.

5. The method of claim 4, further comprising determining the transfer function by:

$$L_1(s) = \frac{RDF2SWT_{na}(s)}{RDF2SWT_{wa}(s)} - 1$$

6. The method of claim 1, wherein algorithms for determining a steering torque assist control signal are stored in a memory of a steering controller, and wherein the controller is unable to access the algorithms stored in the memory of the steering controller.

7. The method of claim 1, further comprising:
   determining, by the controller, a gain margin of the power steering system, wherein the gain margin is an additional amount of gain required for a magnitude of the power steering system to be 0 decibels when a phase of the power steering system is −180 degrees.

8. The method of claim 7, further comprising:
determining, by the controller, a phase margin of the power steering system by calculating an amount of phase lag required for the power steering system to be −180 degrees when the magnitude of the power steering system is 0 decibels.

9. The method of claim 8, further comprising:
determining, by the controller, a Nyquist plot including the gain margin and phase margin; and
calculating a stability margin based on the Nyquist plot.

10. The method of claim 1, wherein the rack disturbance force control signal is a variable waveform that is either a sinusoidal wave, a white noise signal, or a multi-sine signal.

11. A method of determining a frequency response by a power steering system for either a steer-by-wire or an autonomous vehicle, wherein the power steering system includes a steering assist motor configured to generate an assist torque about an axis of a steering shaft when activated, the method comprising:
transmitting, by a controller, a commanded steering angle to a rotary actuator connected to the steering shaft;
in response to receiving the commanded steering angle, actuating the rotary actuator into the commanded steering angle, wherein the rotary actuator maintains position by exerting a steering wheel torque and the steering shaft is connected to the rotary actuator by a compliant torsion bar and inertial wheel;
transmitting, by the controller, a rack disturbance force control signal to at least one actuator, wherein the at least one actuator is coupled to a rack and is configured to apply a rack disturbance force on the rack in a substantially linear direction;
in response to receiving the rack disturbance force control signal, generating a first frequency sweep by the at least one actuator, wherein the steering assist motor is deactivated during the first frequency sweep;
generating a second frequency sweep by the at least one actuator, wherein the steering assist motor is activated and the commanded steering angle is set to zero during the second frequency sweep;
generating a steering angle frequency sweep based on the commanded steering angle, wherein the steering assist motor is activated and the at least one actuator is disconnected during the steering angle frequency sweep;
monitoring, by the controller, a rotary encoder coupled to the steering shaft, wherein the rotary encoder measures a steering angle experienced during the first frequency sweep, the second frequency sweep, and the steering angle frequency sweep;
determining, by the controller, a transfer function based on the steering angle monitored during the first frequency sweep and the second frequency sweep, wherein the transfer function indicates the frequency response of the power steering system; and
determining, by the controller, effects of a feedforward algorithm upon the power steering system based on the steering angle monitored during the steering angle frequency sweep.

12. The method of claim 11, further comprising:
deactivating the at least one actuator and the steering assist motor;
monitoring, by the controller, the rotary encoder that measures the steering angle; and
determining, by the controller, effects of a feedforward algorithm upon the power steering system based on the steering angle.

13. The method of claim 11, comprising determining the transfer function by:
calculating, by the controller, a mechanical transfer function based on the steering angle measured during the first frequency sweep.

14. The method of claim 13, comprising determining the mechanical transfer function by:

$$RDF2SWA_{na}(s) = MTF_1(s) = \frac{SWA_{na}(s)}{RDF_{na}(s)}$$

wherein $RDF2SWA_{na}(s)$ is an estimated transfer function from the rack disturbance force to the steering angle without assistance from the steering assist motor, $SWA_{na}$ is the steering angle without assistance from the steering assist motor, and $RDF_{na}$ is the rack disturbance force without assistance from the steering assist motor.

15. The method of claim 14, comprising determining an estimated transfer function from the rack disturbance force to the steering angle with assistance from the steering assist motor by:

$$RDF2SWA_{wa}(s) = \frac{SWA_{wa}(s)}{RDF_{wa}(s)}$$

wherein $RDF2SWA_{wa}(s)$ represents the estimated transfer function from the rack disturbance force to the steering angle with the steering assist motor activated, $SWT_{wa}$ is the steering angle with the steering assist motor activated, and $RDF_{wa}$ is a rack disturbance force with the steering assist motor activated.

16. The method of claim 15, comprising determining an estimated transfer function from a steering wheel command to the steering angle by:

$$Cmd2SWA_{FF}(s) = \frac{SWA_{ff}(s)}{550_{ff}(s)}$$

wherein $Cmd2SWA_{FF}(s)$ is the estimated transfer function from the steering wheel command to the steering angle, $SWA_{ff}$ is the steering angle with the steering assist motor activated and the at least one actuator disengaged, and $550_{ff}$ is the commanded steering angle with the steering assist motor activated and the at least one actuator disengaged.

17. The method of claim 11, wherein algorithms for determining a steering torque assist control signal are stored in a memory of a steering controller, and wherein the controller is unable to access the algorithms stored in the memory of the steering controller.

18. The method of claim 11, further comprising:
determining, by the controller, a gain margin of the power steering system, wherein the gain margin is an additional amount of gain required for a magnitude of the power steering system to be 0 decibels when a phase of the power steering system is −180 degrees; and
determining, by the controller, a phase margin of the power steering system by calculating an amount of phase lag required for the power steering system to be −180 degrees when the magnitude of the power steering system is 0 decibels.

19. The method of claim 11, wherein the rotary actuator is disengaged during the first frequency sweep.

20. A power steering system, comprising:
- a rack defining a first end portion and a second end portion;
- a first actuator disposed on the first end portion of the rack and a second actuator disposed on the second end portion of the rack;
- a steering shaft rotatable about a steering axis;
- a pinion gear connecting the rack to the steering shaft;
- a steering assist motor configured to generate an assist torque about the steering axis of the steering shaft;
- a torque transducer configured to measure a steering output torque of the steering shaft;
- a rotary actuator;
- a compliant torsion bar and inertial wheel configured to connect the rotary actuator to the steering shaft; and
- a controller in communication with the first actuator, the second actuator, and the rotary actuator, the controller configured to:
  - transmit a commanded steering angle to the rotary actuator, wherein the rotary actuator into the commanded steering angle and maintains position by exerting a steering wheel torque;
  - transmit a rack disturbance force control signal to the first actuator and the second actuator;
  - instruct the first actuator and the second actuator to generate a first frequency sweep and a second frequency sweep, wherein the steering assist motor is deactivated during the first frequency sweep and activated during the second frequency sweep;
  - monitor the torque transducer for the steering output torque of the steering shaft experienced during the first frequency sweep and the second frequency sweep; and
  - determine a transfer function based on the steering output torque monitored during the first frequency sweep and the second frequency sweep, wherein the transfer function indicates a frequency response of the power steering system.

\* \* \* \* \*